Sept. 25, 1951 J. GUNSER 2,568,999
AUTOMATIC FISH HOOKING DEVICE
Filed June 13, 1949
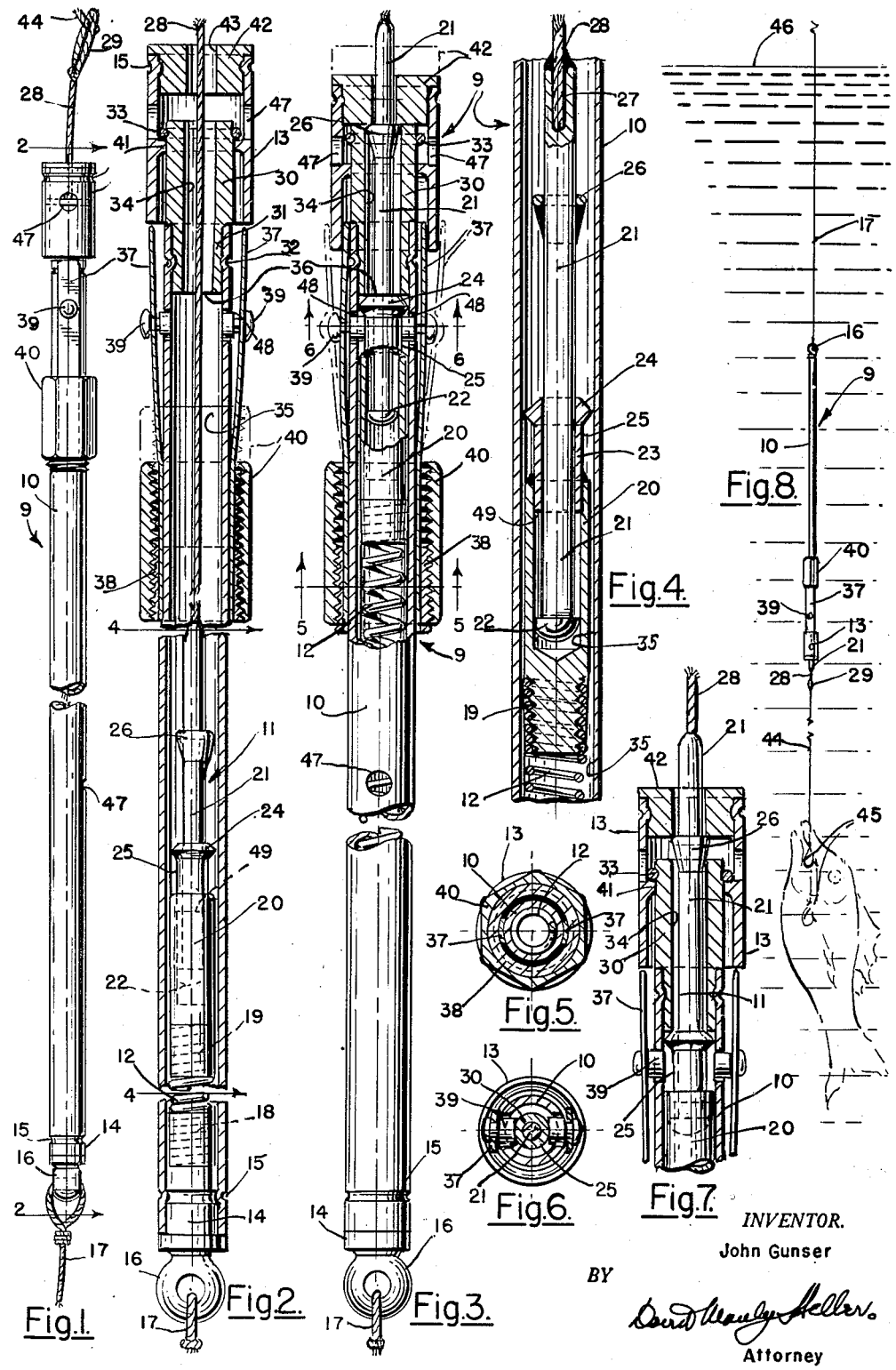
INVENTOR.
John Gunser
BY
David Manly Heller
Attorney Patented Sept. 25, 1951

2,568,999

UNITED STATES PATENT OFFICE 2,568,999

AUTOMATIC FISH-HOOKING DEVICE

John Gunser, Chicago, Ill.

Application June 13, 1949, Serial No. 98,700

4 Claims. (Cl. 43—15)

My invention relates to automatic fish hooking devices.

A prime object of my invention is to provide an automatic fish hooking device to be attached between the fish line and leader line and having spring and trigger means for automatically and forcefully retracting the leader line when the fish takes the bait, thus setting the fish hook firmly in the fish's mouth and hooking the fish.

A further important object of my invention is to provide an automatic fish hooking device having adjustable tension means for varying the trigger setting of my device, permitting adjustments requiring a lighter or heavier pull, depending on the size of the fish to be caught.

A still further object of my invention is to provide an automatic fish hooking device, the trigger setting means of which is simple in construction and easily and quickly set to operating position.

A further object of my invention is to provide an automatic fish hooking device of sturdy design which may be economically manufactured in quantities.

Other objects and advantages embraced in my invention will be disclosed in the following description and the accompanying illustrations, wherein like parts are designated by like numerals and in which:

Fig. 1 is a side view of my invention.

Fig. 2 is an enlarged longitudinal cross-sectioned view of my invention taken substantially on line 2—2 on Fig. 1, and showing the trigger assembly in retracted position.

Fig. 3 is an enlarged side view of my invention with parts broken and cut away to show the trigger assembly in a forward locked or set position.

Fig. 4 is an enlarged longitudinally cross-sectioned view of a portion of my invention taken substantially on line 4—4 on Fig. 2, and showing details of the trigger assembly and its connection to the tension spring.

Fig. 5 is a cross-sectional view of my invention taken substantially on line 5—5 on Fig. 3.

Fig. 6 is a partial cross-sectional view of my invention taken substantially on line 6—6 on Fig. 3.

Fig. 7 is a longitudinal cross-sectional view of a portion of my invention, showing the trigger locking mechanism in the act of being tripped.

Fig. 8 is a view of my automatic fish hooking device shown in one of its uses in a body of water in connection with a fish line, leader and a fish.

Referring to the illustrations, my invention is generally designated 9 and consists of a tubular body element 10, which may preferably be of brass or other non-corroding metal. A trigger assembly 11 and tension spring 12 are mounted within the tube interior 35. A line attaching plug 14 is fixed within one end of tubular body element 10 and held securely in place by a locking groove 15 formed therein. An eye 16 provides means for attaching the fish line 17. Threaded extensions 18 and 19 are formed one on the end of line attaching plug 14, the other on the end of cylindrical trigger housing 20, for securing the ends of tension spring 12 within tube interior 35. One end of a trigger pin 21 is slidably mounted within cylindrical trigger housing 20, held in place by pin head 22 and hollow trigger stop 23, the shoulder 49 of which permits a limited action to trigger pin 21 within the said cylindrical trigger housing 20.

A shoulder 24 on the end of hollow trigger stop 23 defines a reduced button engaging surface 25. A blind bore 27 in the free end of trigger pin 21 serves to secure the end of a flexible wire 28, the other end of which extends through and projects from the end of tubular body element 10, said flexible wire having a looped portion 29 formed thereon for attaching the leader 44. A hollow plug 30 having a reduced portion 31 is secured within the other end of tubular body element 10 by locking groove 32 in its reduced portion 31 and has a central opening 34 which communicates with tube interior 35. The inner end of plug 30 serves as a stop 36 for trigger assembly 11. A wire ring stop 33 is securely attached over the end of hollow plug 30 which, in association with annular flange 41 within locking cap means 13, serves to keep the said locking cap 13 in place over the end of tubular body element 10, allowing it a limited sliding motion.

A trigger stop plug 42 having a central opening 43 is securely mounted within the end of locking cap means 13.

Resilient trigger engaging mounts 37 are attached one on either side of tubular body element 10, near the locking cap end thereof and held in place by a male threaded bushing 38 mounted on tubular body element 10. Trigger engaging nubs 39 are oppositely mounted on resilient trigger engaging mounts 37 in alignment with nub clearance holes 48 in tubular body element 10. A tension adjusting nut 40 is mounted upon male threaded bushing 38 and serves as a tension adjuster for resilient trigger engaging mounts 37. The said nut 40 fits loosely on bushing 38 to permit a locking action when it engages resilient trigger engaging mounts 37. By advancing nut 40 as shown in phantom lines on Fig. 2, the trigger mounts 37 are compressed slightly, providing a trigger setting means requiring a heavier tug at the lead line 44. By retracting nut 40 as shown in solid line position, resilient trigger mounts 37 will provide a finer trigger setting, more easily tripped, which may be desirable in fishing for small fish.

A shoulder collar 26 is welded upon trigger pin 21, midway between shoulder 24 and line attaching end at the blind bore 27. The said shoulder collar 26, together with engaging nubs 39, trigger stop plug 42, hollow plug 30 and shoulder 24 would preferably be formed of hardened steel to prevent wear thereon and to maintain a fine adjustment to the trigger mechanism.

Figures 1 and 2 show my automatic fish hooking device with the trigger assembly in retracted and unlocked position. To use my automatic fish hooking device, the tubular body element 10 is held in one hand, the flexible wire extension 28 or the loop portion 29 thereof, is grasped and pulled outward as far as it will extend, bringing trigger assembly 11 to the locking position within tubular body element 10 as shown in Fig. 3, with reduced button engaging surface 25 in alignment with engaging nubs 39. The thumb and finger 50 press resilient trigger mounts 37 inwardly and locking cap means 13 is pushed into locking position as shown by phantom and solid lines in Fig. 3, with the open end thereof engaging the free ends of the now compressed resilient trigger mounts 37. In this position the shoulder collar 26 will be touching trigger stop plug 42. The trigger pin 21 is positioned with its head 22 toward the closed end of cylindrical trigger housing 20 as shown in Figs. 3 and 4.

My automatic fish hooking device may be used in several ways. It may be attached between fishing line 17 and leader 44 and held with the fish hooking device above the surface of the water, or it may be held or used with the said fish hooking device beneath the surface 46 of the water as shown in Fig. 8, wherein a fish, drawn in phantom lines, is shown in the act of taking the baited hook 45. As the fish takes the baited hook 45 the slight resulting pull upon leader 44 pulls trigger 21, together with locking cap 13, outwardly, tripping the trigger mechanism and allowing tension spring 12 to forcefully retract the trigger pin 21 and lead 44, a sufficient distance to firmly imbed hook 45 within the mouth of the fish, as shown by solid and phantom lines in Fig. 8. Fig 7 illustrates the action of shoulder collar 26 against trigger stop plug 42 in the act of tripping the trigger mechanism.

Vent openings 47 are provided in tubular body element 10 and locking cap means 13 to allow the flow of water through the interior 35 and prevent a slowing of the retracting action of the trigger mechanism when tripped, and also to serve as lubricating holes.

My automatic fish hooking device is adaptable for use in still fishing and may be used with or without float and weight. My device does not require constant attention to his pole by the fisherman.

A further advantage residing in my automatic fish hooking device is its small size, about the size of a lead pencil, and its adaptability to any fish line or fishing equipment.

Although I have herein described rather succinctly the nature and use of my invention so that persons skilled in the art will have no difficulty apprising themselves of the teachings thereof and, inasmuch as the disclosure is susceptible of various alterations, modifications, and improvements, I hereby reserve the right to all modifications, alterations, and improvements falling within the scope and spirit of my invention, as well as any modifications that are embraced suggestively in the accompanying drawings, and any that may come within the purview of the foregoing description; my invention to be limited only by the appended claims.

Having thus disclosed and revealed my invention, what I claim as new and desire to secure by Letters Patent is:

1. Automatic fish-hooking means comprising, tubular body means, line attaching plug means secured to one end of the said tubular body means, trigger including a trigger pin assembly means mounted slidably within the confines of the said tubular body means, spring means interconnecting the said trigger assembly means to the said line attaching means, resilient trigger engaging mounts secured intermediately the ends of the said tubular body means adapted to releasably engage the said trigger assembly means, locking cap means slidably secured to one end of the said tubular body means and adapted to releasably engage the said resilient trigger engaging mounts, flexible wire means connected to the said trigger pin of the assembly means, and shoulder collar means secured to the said trigger pin for tripping the said locking cap means.

2. Automatic fish-hooking means comprising, tubular body means, line attaching plug means secured to one end of the said tubular body means, trigger including a trigger pin assembly means mounted slidably within the confines of the said tubular body means, spring means interconnecting the said trigger assembly means to the said line attaching means, resilient trigger engaging mounts secured intermediately the ends of the said tubular body means adapted to releasably engage the said trigger assembly means, locking cap means slidably secured to one end of the said tubular body means and adapted to releasably engage the said resilient trigger engaging mounts, flange means interiorly of the said locking cap means, stop means on the end of the said tubular body means to limit the relative movement of the said locking cap means, flexible wire means connected to the trigger pin of the said trigger assembly means, and shoulder collar means secured to the said trigger pin for tripping the said locking cap means.

3. Automatic fish-hooking means comprising, tubular body means, line attaching plug means secured to one end of the said tubular body means, trigger including a trigger pin assembly means mounted slidably within the confines of the said tubular body means, spring means interconnecting the said trigger assembly means to the said line attaching means, resilient trigger engaging mounts secured intermediately the ends of the said tubular body means adapted to releasably engage the said trigger assembly means, locking cap means slidably secured to one end of the said tubular body means and adapted to releasably engage the said resilient trigger engaging mounts, tension adjusting nut means threadably secured to the said tubular body means at a point adjacent the point of anchorage of the said resilient trigger engaging mounts to afford variable adjustment to the release thereof, flexible wire means connected to the trigger pin of the said trigger assembly means, and shoulder collar means secured to the said trigger pin for tripping the said 4. Automatic fish-hooking means comprising, tubular body means, line attaching plug means secured to one end of the said tubular body means, trigger including a trigger pin assembly means mounted slidably within the confines of the said tubular body means, spring means interconnecting the said trigger assembly means to the said line attaching means, resilient trigger engaging mounts secured intermediately the ends of the said tubular body means adapted to releasably engage the said trigger assembly means, locking cap means slidably secured to one end of the said tubular body means and adapted to releasably engage the said resilient trigger engaging mounts, flange means interiorly of the said locking cap means, stop means on the end of the said tubular body means to limit the relative movement of the said locking cap means, tension adjusting nut means threadably secured to the said tubular body means at a point adjacent the point of anchorage of the said resilient trigger engaging mounts to afford variable adjustment to the release thereof, flexible wire means connected to the trigger pin of the said trigger assembly means, and shoulder collar means secured to the said trigger pin for tripping the said locking cap means.

JOHN GUNSER.

REFERENCES CITED

The following references are of record in the file of this patent:

UNITED STATES PATENTS

| Number | Name | Date |
| --- | --- | --- |
| 2,147,917 | Noren | Feb. 21 1939 |

FOREIGN PATENTS

| Number | Country | Date |
| --- | --- | --- |
| 710,595 | France | June 9, 1931 |